United States Patent [19]

Keiser

[11] 3,855,425

[45] Dec. 17, 1974

[54] DELAY LINE TIME COMPRESSOR AND EXPANDER

[76] Inventor: Bernhard E. Keiser, 2046 Carrhill Rd., Vienna, Va. 22180

[22] Filed: June 14, 1973

[21] Appl. No.: 369,810

Related U.S. Application Data

[63] Continuation-in-part of Ser. No. 191,010, Oct. 20, 1971, abandoned.

[52] U.S. Cl. .......................................... 179/15.55 T
[51] Int. Cl. ............................................ H04b 1/66
[58] Field of Search .............. 179/15.55 R, 15.55 T; 178/DIG. 3; 333/14, 17, 29

[56] References Cited

UNITED STATES PATENTS

| | | | |
|---|---|---|---|
| 2,014,081 | 9/1935 | Csepely | 179/15.55 R |
| 2,115,803 | 5/1938 | Dudley | 179/15.55 R |
| 2,705,742 | 4/1955 | Miller | 179/15.55 R |
| 2,897,442 | 7/1959 | Wright | 333/29 |
| 3,032,725 | 5/1962 | Knox-Seith | 333/14 |
| 3,283,080 | 11/1966 | Caputi | 179/15.55 R |
| 3,512,160 | 5/1970 | Meeker | 333/14 |
| 3,786,195 | 1/1974 | Schiffman | 179/15.55 T |

*Primary Examiner*—Kathleen H. Claffy
*Assistant Examiner*—Thomas D'Amico

[57] ABSTRACT

This invention relates to a system for changing the bandwidth of an intelligence-bearing electrical signal so that it can be transmitted within said changed bandwidth and to a counterpart system for changing the bandwidth, following transmission, so that a good replica of the original signal is obtained at a receiving terminal. The bandwidth compression and expansion are obtained through time-delay expansion and compression. This invention uses the fact that the time delay characteristic of an electrical all-pass network is a function of frequency. Variable time delay can be achieved by modulating the initial signal onto a carrier whose frequency then is varied so that the desired time delay variation is achieved.

6 Claims, 8 Drawing Figures

A. NETWORK CONFIGURATION B. TRANSMISSION CHARACTERISTICS

DELAY LINE TIME COMPRESSOR AND EXPANDER

RELATED APPLICATIONS

The present application is a continuation in part of U.S. application Ser. No. 191,010, filed Oct. 20, 1971 now abandoned.

BRIEF SUMMARY OF THE INVENTION

This invention belongs to the class of devices known as delay line time compressors. Prior to this invention, such devices used one of the following means of operation: (1) A fixed acoustic delay line and sampling process, (2) conversion to digital form and/or pulse regeneration and gating, (3) mechanical commutation, (4) cathode-ray tube techniques, (5) delay lines with variable reactances. Other such devices were built for special purposes and required the artificial reconstruction of speech, or split channel operation, or operated only on short bursts of energy. The disadvantages of the foregoing prior embodiments are that (1) acoustic delay lines require the use of acoustic transducers, with their sensitivity to mechanical vibrations which can interfere with the operation of the device, resulting in unwanted noise, (2) the use of pulse circuits requires input conversion to binary form with its attendant bandwidth increase, or else highly accurate timing, and is subject to performance deterioration if timing at the sending and receiving ends is not properly synchronized, (3) mechanical commutators and tape players with moving heads, etc., are limited in their high frequency response, or may require difficult-to-adjust synchronous operations, (4) the use of cathode-ray tubes results in bulky packaging and in performance that is sensitive to cathode-ray screen characteristics or electrode placement or both, (5) delay lines with variable reactances are subject to performance variations from time to time since all reactances must vary together in a prescribed fashion or else the delay variation per element is very small relative to the total delay, thus requiring an excessive line length. The invention described herein operates over a broad frequency band on all spectral components uniformly. Specially selected samples of the input are not required, the samples simply being taken periodically. It does not require the artificial reconstruction of the input based on its special characteristics, such as speech elements; it operates on continuous signals as well as on short bursts; and it does not require split-band operation although this may be used if desired. Furthermore, it does not require the reconstruction of a frequency-domain replica of the original signal in order to provide continuity from one sampled period to the next.

An object of this invention is to provide a straight forward method for compressing the bandwidth of continuous (analog) signals that contain a high degree of redundancy from an information theory viewpoint. A further object of this invention is to compress the bandwidth of continuous signals such that the wave shape is preserved during each sampling period.

This invention uses a delay line consisting of a ladder of "all-pass" or "equalizer" networks which have the property that their attenuation is constant with frequency, but their phase shift varies from 0° to 180° as a function of frequency. Moreover, the phase versus frequency characteristic of these networks is such that the time delay is a function of frequency. By modulating the input onto a carrier frequency and passing the resulting signal through the ladder, a delay will result that depends on the frequency of the carrier. Thus variation of the carrier frequency produces a variation in delay which can be controlled in the manner desired. Increasing the delay stretches the waveform in the time domain, thus compressing its bandwidth, while reducing the delay compresses the waveform in the time domain, thus expanding its bandwidth. In the bandwidth expansion process, some means of re-introducing the redundancy into the signal must be provided. A tape recorder can be used for this purpose without adversely affecting the system's capabilities since its function is simply to repeat the bandwidth expanded (time compressed) waveform a number of times equal to the compression factor. A hold and compare combining circuit provides for the transitions from one waveform period to another at the expansion end without sudden jumps that would otherwise broaden the bandwidth needlessly.

DESCRIPTION OF THE DRAWINGS

In the accompanying drawings, forming a part of this specification and showing, for purposes of exemplification, preferred forms of this invention without limiting the claimed invention to such illustrative instances:

DETAILED DESCRIPTION

Figure 1:
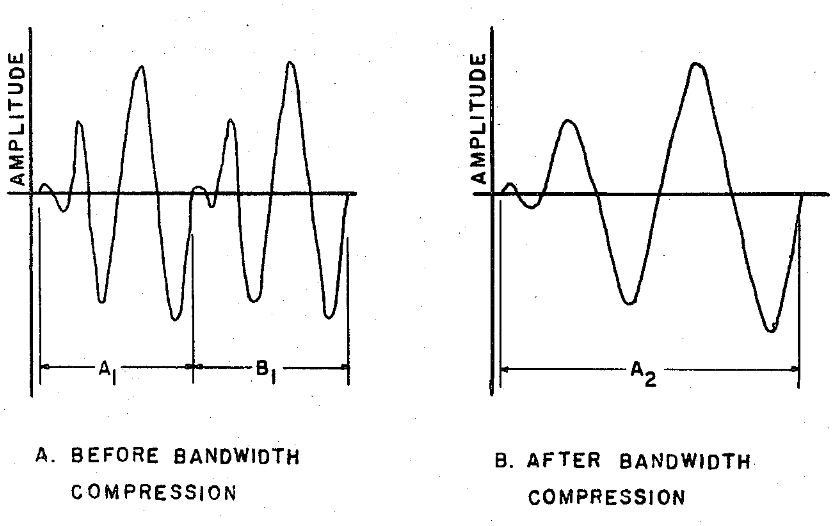
FIG. 1 illustrates the principle of time-domain bandwidth compression, showing a waveform that is expanded by 2:1 in the time domain.

With reference to FIG. 1, a representative segment of an input signal is selected such that the duration of this segment is at least as long as the period of the lowest frequency component of the input signal. For example, if the input signal is a speech waveform occupying the band 300 to 3,000 hz, the duration of the segment should be at least 3.3 msec. Thus, Let $f_L$ = lowest frequency in spectrum to be compressed $s$ = sampling rate
$m$ = bandwidth compression factor=time expansion factor Then $$m = f_l/s \quad (1)$$

In this example, if $m = 15$, the 300 to 3,000 hz spectrum is compressed to 20 to 200 hz.

A study of FIG. 1 shows that waveform (*b*) can be produced from waveform (*a*) by subjecting (*a*) to a variable delay, $\tau$, that starts at zero and equals ($A_2$-$A_1$) at the end of the first period of the waveform displayed there. Thus, $$m = 1 + d\tau/dt \quad (2)$$

If $m$ is an integer, completion of the output cycle will occur at the start of an input cycle, provided also that the effective period of the input has not changed.

Since the input is assumed to be an information-bearing signal with redundancies, however, no "period" generally can be defined for the input. Consequently, the compressor takes samples based on a period determined by the compressor setting and the resulting samples are assumed to be representative of the entire input.

With respect to the voice transmission of the above example, the 300 to 3,000 hz spectrum is sampled 20 times per second. Each sample is the length of a single 300 hz cycle. Thus higher spectral components (up to 3,000 hz) may contain up to 10 cycles per sample. From one sample to another, no phase coherency can be expected. If it exists, it will not be preserved beyond an input duration equal to the sample length (3.3 msec. in the example). Other examples can be devised if the transmission is a video or other type of information-bearing signal.

With reference again to FIG. 1, completion of the output segment must be accompanied by a return of the time delay, $\tau$, to zero, or its minimum value, so that it can operate upon the next input cycle. Furthermore, completion of the input segment must cause a shut-off of the input until the output segment is complete. During the time delay flyback time, a hold circuit operates to keep the output value constant until the new segment starts coming out, at which time a compare circuit switches to it at an instant when the output values coincide. This prevents the generation of a step function with its out-of-band components.

The maximum time delay reached can be pre-set based upon the compressor design and the signal being processed for transmission. Conceptually, the variable time delay system is comparable to a telescoped cylinder or pipe that is lengthened as fluid flow occurs through it, and then is suddenly shortened. (Provision must be made to handle the fluid in the pipe when it is suddenly shortened; this corresponds to currents and voltages in reactive elements which must be disposed of very rapidly, or prevented from flowing at specific times.)

For bandwidth expansion, the delay system must operate in reverse, i.e., the delay is maximum at the start of a cycle and drops to minimum. In this case, provision must be made to repeat the input cycle m times to provide for correct bandwidth expansion.

Figure 2:
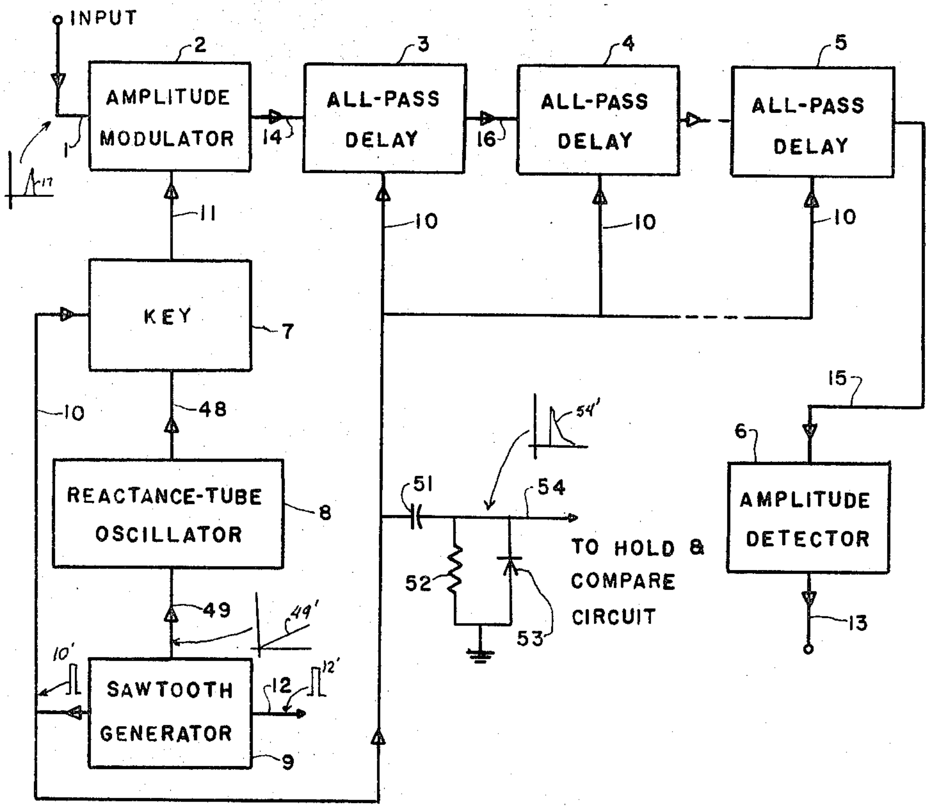
FIG. 2 is a block diagram illustrating the elements that may be used with the variable delay circuit in minimizing irregularities during the flyback period, when the time delay returns to its initial value.

A block diagram of a variable delay network is shown in FIG. 2. This network can be made to function either as a compressor or an expander, depending on whether the sawtooth generator 9 raises or lowers the carrier frequency during the sweep, and depending on the all-pass network design, as explained below. The operation of the variable delay network is as follows: The signal input 1 is amplitude modulated onto a carrier 11 above the baseband. This carrier is swept by means of a reactance-tube-controlled oscillator 8 that is driven by a sawtooth wave 49′ from sawtooth generator 9. As the sawtooth 49′ goes from its minimum to maximum value, the carrier frequency 48 is swept such that the delay through the all-pass networks 3, 4, 5 varies from its minimum to maximum (or the reverse, depending on design). This delay variation occurs entirely as a result of the carrier frequency variation of signal 14.

The key 7 in response to pulse 10 from sawtooth generator 9 is a gating circuit that cuts off the carrier 48 at the proper time to prevent unwanted energy from entering the all-pass delay sections during compression. Carrier signal 11 is the same as carrier signal 48 except that carrier signal 11 has zero amplitude during the flyback time of sawtooth 49. Pulse 10 also causes resistive elements to be inserted for the dissipation of energy in the reactive elements of the all-pass networks during the "flyback time" when the delay is returned from its maximum to its minimum time, or vice versa, thus preventing undesired transients. Output signal 15 of delay network 5 is a delayed replica of signal 14. Amplitude detector 6 demodulates signal 15 thus producing output signal 13.

Figure 3:
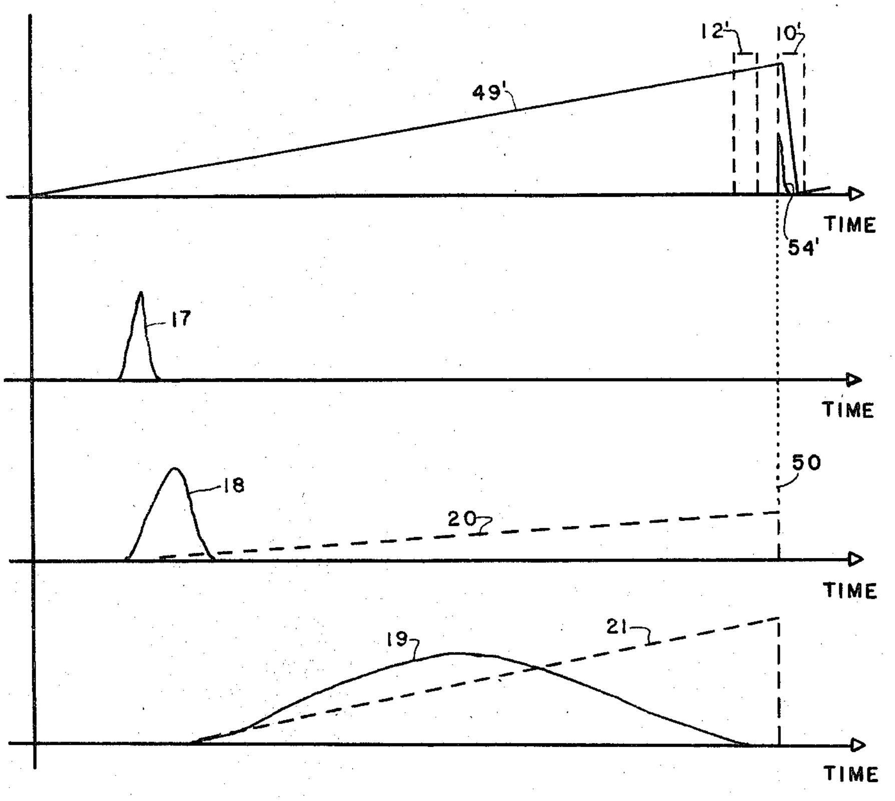
FIG. 3 is a timing diagram illustrating the operation of the system.

Further understanding of the operation of the elements of FIG. 2 can be gained by reference to FIG. 3, showing the sawtooth 49′, blanking pulse 10′ and showing the waveform 17 of the original signal input 1 of FIG. 2, the output 18 of the first all-pass delay network (point 16 in FIG. 2) and the output 19 of the final all-pass delay network (point 15 in FIG. 2). Dashed lines 20 show the time delay of the first all-pass network 3 and dashed lines 21 show the time delay of the cascade of delay networks, 3, 4 and 5. Note that these time delays all stop when blanking pulse 10′ begins.

Note that the time delays of the all-pass networks are controlled simultaneously, each one contributing a small portion of the total. Control of the time delay is accomplished through the amplitude modulator 2 of FIG. 2 since the instantaneous value of time delay is a function of the instantaneous value of the carrier frequency, which is applied by the amplitude modulator 2 of FIG. 2. The sawtooth generator 9 controls the actual sweep of the time delay value by controlling the reactance-tube-oscillator's 8 frequency. The frequency, in turn, is applied via the key 7 to the amplitude modulator 2. The sawtooth generator, during flyback, also via output 10, causes the discharge of each of the reactive elements in the all-pass networks, 3, 4 and 5.

Figure 4:
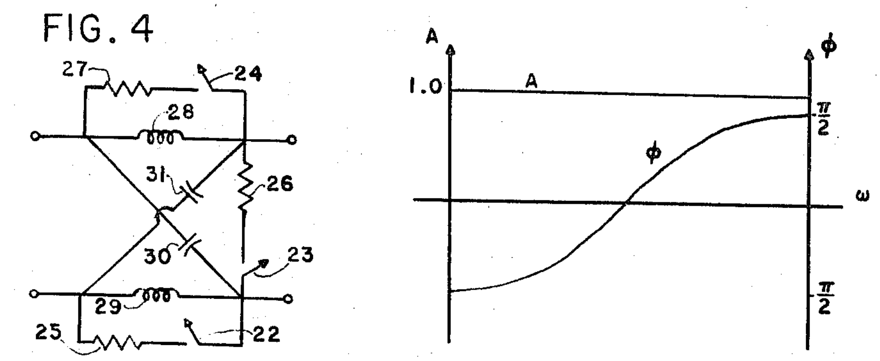
FIG. 4 illustrates a section of an all-pass delay network, together with typical amplitude and phase characteristic curves.

A single element of all-pass delay is shown in FIG. 4A. This type of network (or its equivalent) is used because its delay can be made to vary as a function of frequency, but its attenuation is independent of frequency, as can be seen in FIG. 4B. During delay time flyback, a signal on line 10 of FIG. 2 closes switches 22, 23 and 24 of FIG. 4. As is well known, these switches can be transistors or relays. The resistors 25, 26 and 27 have values of 1 to 10 ohms to dissipate energy of reactances 28, 29, 30 and 31. The use of such resistors and switches for discharging reactive elements is disclosed in standard textbooks, e.g., Jackson, Hubert W., "Introduction to Electric Circuits" Prentice-Hall, second edition, 1965, pp. 264–265, et al.

Because the all-pass delay circuit is basic to the operation of the variable delay network, its behavior and use will be treated in sufficient detail to explain the choice of network parameters related to it. The following terms will be used:

$f_H$ = upper frequency (3,000 hz for speech) of band to be compressed
$f_L$ = lower frequency (300 hz for speech) of band to be compressed
$\tau$ = delay introduced to stretch input in time, thereby compressing spectrum
$\tau_o$ = minimum possible $\tau$
$\tau_{max}$ = maximum value of $\tau$
$N$ = number of sections of all-pass network
$\omega_o$ = radian center frequency of all-pass network
$\omega$ = radian frequency of carrier sent through all-pass network
$R$ = rate at which carrier is swept through all-pass network (hz/sec.)
$\phi$ = phase shift of all-pass network
$t$ = time
$m$ = bandwidth compression factor = time expansion factor
$S$ = sampling rate of input signal (estimated at 20/sec. min. for speech)
$\omega_{min}$ = lowest carrier radian frequency through all-pass network
$\omega_{max}$ = highest carrier radian frequency through all-pass network The phase shift characteristic of the all-pass network of FIG. 4 is given by $$\phi = \tan^{-1} (\omega - \omega_o/\omega_o) \text{ where } \omega_o = 1/\sqrt{LC} \quad (3)$$

Its delay, $\tau$, is $$\tau = (d\phi/d\omega) = [\omega_o/\omega_o^2 + (\omega - \omega_o)^2] \quad (4)$$

for $\omega$ sufficiently close to $\omega_o$ that the parameter $x = (\omega - \omega_o/\omega_o) << 1$, $$\tau \approx 2\omega/\omega_o 2 \quad (5)$$

Thus if the carrier frequency varies linearly, the time delay, $\tau$, also varies linearly to a first approximation.

Letting $\omega = Rt + \omega_o$, an $N$-section all-pass network will have a phase shift of $$\phi = N\tan^{-1} (\omega - \omega_o/\omega_o) \quad (6)$$

and a delay of $$\tau \approx 2(\omega_o + Rt)N/\omega_o 2 \quad (7)$$

Thus $$\tau_o \approx 2N/\omega_o \quad (8)$$

and $$\tau - \tau_o \approx 2RNt/\omega_o 2 \quad (9)$$

The number of sections $N$ required can be determined from the fact that $$\tau_{max} = m - 1/f_L \quad (10)$$

Equation (4) shows that $\tau$ reaches a maximum at $\omega = \omega_o$ and is less for other values of $\omega$. This means that the portion of the all-pass network characteristic that is used must be restricted to the region above or to the region below $\omega_o$. In order suitably to restrict the range of $\omega$ values required, each all-pass section will be assumed to operate only from 5° to 50° phase shift. Under these conditions, $$N = [8m\ (f_H - f_L)/f_L] \quad (11)$$

(The constant 8 results from the fact that eight sections, each capable of a 45° shift, are required per cycle.) Note the dependence of $N$ on the baseband width, $f_H - f_L$. This results from the fact that each section produces only a 45° phase shift and that the total phase shift required is proportional to the frequency for a given time delay. Production of a single cycle (360°) of shift at $f_L$ corresponds to a time delay requirement equivalent to $f_H/f_L$ cycles of shift at $f_H$. (Since the baseband is translated to a separate frequency range for the delay operation, the numerator is $f_H - f_L$ rather than $f_H$).

The sampling rate cannot exceed the lowest frequency after compression, in order that a full cycle of output be produced before a new sample is taken. Thus, $$S = f_L/m \quad (12)$$

The values of $R$ and $\omega_o$ can be assigned based on the following relationships. Since $\omega - \omega_o = Rt$, and since a single section produces a $\pi/4$ phase shift at $$\omega - \omega_o/\omega_o = \pi/4$$
$$\omega_{max} = \omega_o\ (1 + \pi/4 + \epsilon)$$
$$\omega_{min} = \omega_o\ (1 + \epsilon)$$
$$\omega_{max} - \omega_{min} = \pi/4\omega_o = R\tau_{max} \text{ for a single stage}$$
$$\omega = 4R\tau_{max}\pi N \text{ for one of } N \text{ stages} \quad (13)$$

To prevent aliasing, (i.e., spectrum overlap), $$\omega_{min} > 2\pi f_u \quad (14)$$

As a numerical example, compression of the 300 to 3,000 hz spectrum to 20 to 200 hz requires the following parameters.

$m = 15$
$\tau_{max} = 46.7$ msec.
$N = 1,080$
$S = 20$/sec.

Thus each 3.3 msec. cycle (300 hz) is lengthened to 3.3+46.7 = 50.0 msec. (20 hz). For expansion at the receiving end, then, the 50.0 msec. cycle (20 hz) starts thru a 46.7 msec. delay line whose delay drops to zero, thus resulting in a 3.3 msec. cycle (300 hz). (Actually zero delay is not attainable, so a fixed $\tau_o$ must be added to obtain the true $\tau_{min}$ and $\tau_{max}$).

A reduction in the number of required sections can be achieved by splitting the spectrum into two segments at a mid frequency, $f_M$, such that $$f_H - f_M / f_M = f_M - f_L / f_L \qquad (15)$$

Thus $$f_M = f_H f_L$$

Figure 5:
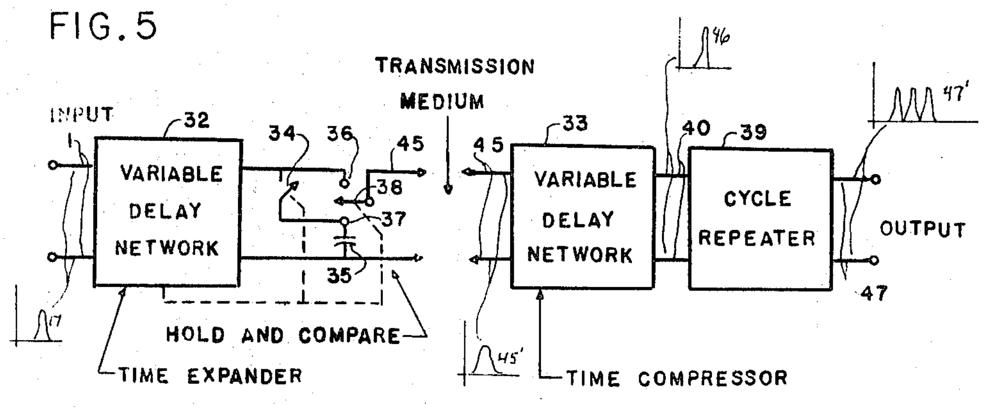
FIG. 5 illustrates a chain of elements comprising a bandwidth compressor, with hold and compare circuits to provide for a smooth output during the delay circuit flyback time while having no effect at other times; and a bandwidth expander consisting of a variable delay circuit operated as a time compressor, followed by a tape repeater, which restores the redundant portions of the signal that were eliminated for transmission.

FIG. 5 shows one variable-delay network 32 used as a time expander (prior to application of the signal to the transmission medium) and one as a time compressor 33 (after receipt of the signal from the transmission medium). Since the variable delay network 32 produces output segments whose time duration differs from the input segments or samples, a hold circuit consisting of switch 34 and capacitor 35, as well as a compare circuit (not shown, but of standard type in the art), to control switch arm 38 are provided at the output of network 32 to obtain continuity between output segments, thus minimizing the generation of spurious spectral components.

The operation of the hold and compare circuit is as follows: As signified by the dashed line in FIG. 5, controls of switches 34 and 38 are obtained from within variable delay network 32. Further details are shown in FIGS. 2 and 3 in which pulse 12′ (derived from a standard Zener diode type of circuit in the sawtooth generator) and then pulse 10′ (triggered from pulse 12′, but delayed) are obtained from sawtooth generator 9 near the peak of sawtooth 49′. Capacitor 51, resistor 52 and diode 53, constituting a standard differentiator circuit with negative going output clipped, produce pulse 54′, a sharp pulse occurring at the leading edge of pulse 10′, as indicated in FIG. 3, at time 50.

With reference to FIG. 5, pulse 12′ causes switch 34 to close briefly, thus causing the output level of variable delay network 32 to be stored on capacitor 35. At the end of pulse 12′, switch 34 opens, thus leaving capacitor 35 charged. Following this, pulses 10′ and 54′ occur. Pulse 54′ causes switch 38 to move from its normal contact 36 to contact 37, thus causing the output to the transmission medium to be the level stored on capacitor 35. (Standard provisions for preventing the charge from draining from capacitor 35 will be obvious to those skilled in the art.) During the flyback time of sawtooth 49′, the voltage at contact 36 will contain undesired transients. However, the output to the transmission medium is constant at the level stored on capacitor 35. After flyback is complete, the level on contact 36 is compared to the level on contact 37 by means of an electronic (high input impedance) compare circuit (not shown) of a type standard in the art. When the two levels become equal, switch arm 38 moves from contact 37 back to contact 36, whereupon the hold and compare circuit ceases to function until the next pulse 12′ arrives, at which time the above-described sequence is repeated.

Operation of the cycle repeater 39 with the variable delay network of FIG. 5 is as follows:

In any period of time greater than $m/f_L$, there must be $m$ cycles received for every one transmitted. The variable delay network provides a time compression to each cycle received, but then each compressed cycle must be repeated $m$ times in order for the output to be a good approximation to the original input at the transmitting end. In one embodiment of this invention, the cycle repeater function is accomplished by recording on magnetic tape and immediately playing back the single recorded cycle on a number of heads equal to the compression ratio. The tape is looped only for tape economy, since a given segment of tape is not otherwise needed after it has passed the last playback head. A comparator of standard design is included within the cycle repeater to switch among tape heads to provide output continuity.

Figure 7:
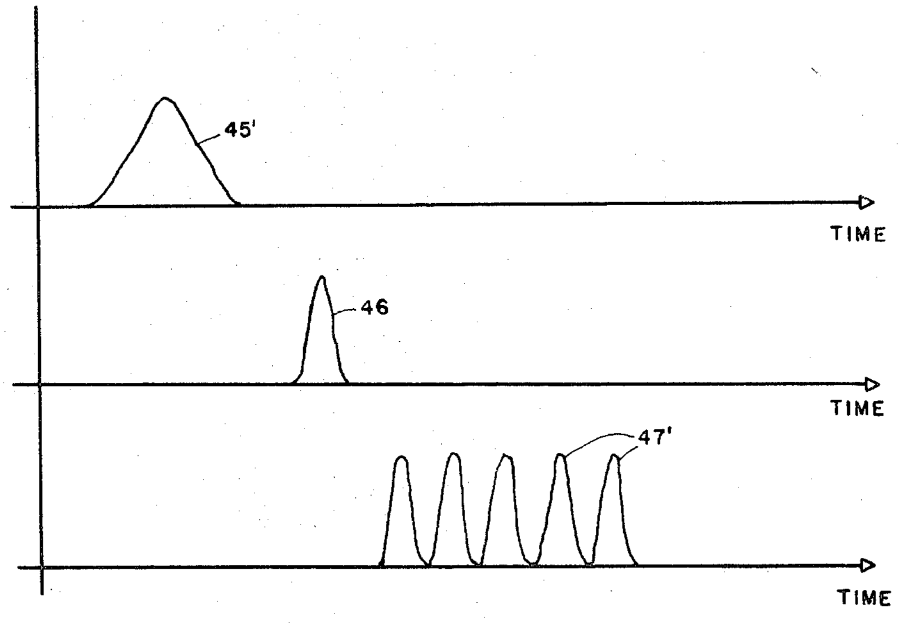
FIG. 7 is a timing diagram illustrating the operation of the cycle repeater with the time compressor.
Figure 6:
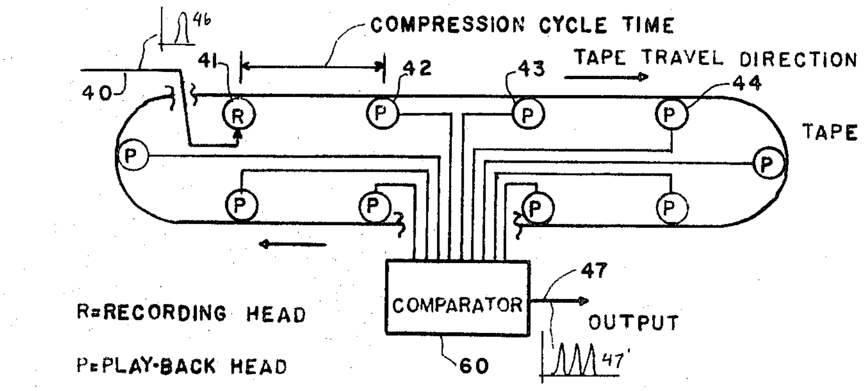
FIG. 6 illustrates a tape repeater in which the speed of the tape is controlled by the time compression cycle time of the associated compressor so that upon completion of a single cycle that cycle then is repeated $m$ times, where $m$ is the compression ratio.

FIG. 6 illustrates a tape-loop cycle repeater. The input signal 40 is applied to recording head 41 (also designated R). The playback heads 42, 43, 44, etc., (also designated P) repeat what has been recorded on the tape by head 41. Because the compressor outputs are tape recorded, no hold circuit is required, there being adequate segment continuity possible through proper placement of the tape heads. However, the comparator 60 is used to switch from one segment to the other at instants when the segment signals are equal. These segments come from adjacent tape playback heads in sequence. The tape repeater records all output from the time compressor and runs continuously. It is adjusted by a signal from the time compressor, to which it is attached, such that the compression cycle time equals the time for the tape to travel from the record head to the first playback head. All heads are equally spaced. The number of heads is equal to the maximum compression ratio. The number of heads used equals the actual compression ratio. The first $m$ heads are always used. FIG. 7 further illustrates the operation of the cycle repeater with the time compressor. In general, output will exist from only one tape head at a time because of the nature of the output from the variable delay network 33. As an example, signal 45′ at the input to variable delay network 33 is time compressed such that the output of network 33 is signal 46. Signal 46, in turn, is repeated by the cycle repeater such that its output, appearing at the output of the comparator, is signal 47′.

Figure 8:
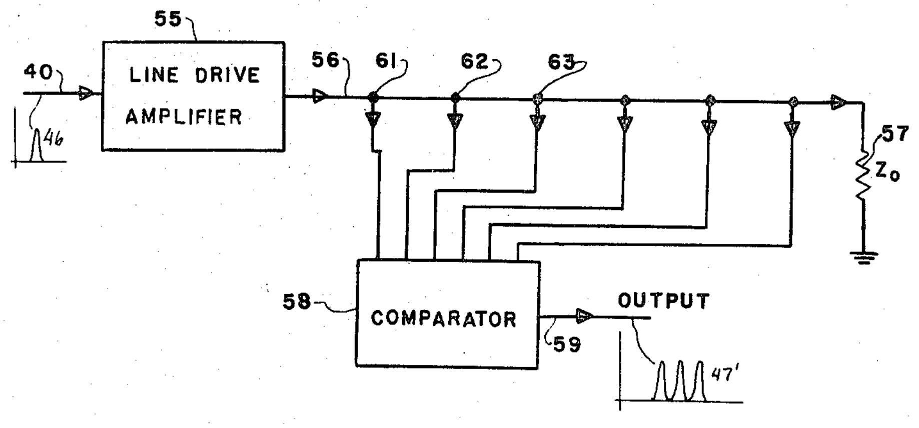
FIG. 8 illustrates a delay line cycle repeater.

An alternative to the tape repeater is fixed delay line, as shown in FIG. 8. The input signal 46 on line 40 is applied to line drive amplifier 55, which feeds transmission line 56. Line 56 is terminated in the characteristic impedance, $Z_o$, 57. Line 56 may be any fixed delay line capable of a delay equal to $\tau_{max}$ (see Equation 10) and capable of having adjustable taps attached to it. For the numerical example presented earlier, the total delay required is nearly 50 msec. Examples of such delay lines are acoustically driven wires arranged in compact forms, such as helices, as well as adjustable electronic delay lines. (With reference to the discussion under the Brief Summary of the Invention, the disadvantages of such lines are less severe in fixed delay applications such as the cycle repeater than they are in variable delay applications such as the time compressor/expander.)

Delay line 56 has adjustable taps, 61, 62, 63, etc., from which replicas of input signal 46, delayed by various amounts, are obtained. These outputs, segments of the original input, are combined in comparator 58, which selects one tap output semgent after another at instants when these segments are equal in amplitude. These outputs segments come from adjacent delay line taps in sequence. Continuous adjustment of the line, as was mentioned for the tape loop cycle repeater, should not be necessary since the delays between taps should normally remain more nearly constant during operation. The taps are all equally spaced; their number is equal to the maximum compression ratio. The number of taps used equals the actual compression ratio; the first *m* taps are always used. In general, output will exist from only one tap at a time because of the nature of the output from the variable delay network 33. As an example, signal 45' at the input to variable delay network 33 is time compressed such that the output of netwrok 33 is signal 46. Signal 46, in turn, is repeated by the cycle repeater such that its output, appearing at the output of comparator 58, is signal 47'.

In general the time compressor (at the receiving end) need not operate in synchronism with the time expander (at the transmitting end).

What is claimed is:

1. A delay line time expander and a delay line time compressor for compressing an information signal into a narrow bandwidth, and subsequently expanding it to the original bandwidth, comprising:

a delay line time expander which requires only a time expansion means and which consists of:

a first amplitude modulator for impressing said information signal on a first carrier signal to produce a first amplitude modulated signal;

a first series of identical all-pass delay networks, having a predetermined phase versus frequency characteristic, responsive to the first amplitude modulated signal produced by said first amplitude modulator;

a first key for gating said first carrier signal to said first amplitude modulator;

a first sawtooth-controlled reactance-tube oscillator for producing said first carrier signal and for sweeping, with a first sawtooth waveform, the frequency of said first carrier signal, said first carrier signal then being sent through said first key at all times, except during said first sawtooth waveform's flyback, to said first amplitude modulator and thence to said first series of all-pass delay networks to impart a first variable time delay to said first amplitude modulated signal as obtained at the output of said first series of all-pass delay networks;

a first amplitude detector responsive to said first series of all-pass delay networks to produce a time expanded information signal; and, a delay line time compressor which requires only a time compression means and a cycle repetition means, said delay line time compressor consisting of:

a second amplitude modulator for impressing said time-expanded information signal on a second carrier signal to produce a second amplitude modulated signal;

a second series of identical all-pass delay networks constructed with the same phase vs. frequency characteristics as said first series, and responsive to the second amplitude modulated signal produced by said second amplitude modulator;

a second key for gating said second carrier signal to said second amplitude modulator;

a second sawtooth-controlled reactance-tube oscillator for producing said second carrier signal and for sweeping with a second sawtooth waveform, whose repetition rate is the same as that of said first sawtooth waveform, the frequency of said second carrier signal, said second carrier signal then being sent through said second key at all times, except during said second sawtooth waveform's flyback, to said second amplitude modulator and thence to said second series of identical all-pass delay networks to impart a second variable time delay to said second amplitude-modulated signal as obtained at the output of said second series of all-pass delay networks, said second variable time delay being maximum when said first variable time delay is minimum, and vice versa;

a second amplitude detector responsive to said second series of all-pass delay networks to produce a time-compressed signal; and, a cycle repetition means connected to the output of said delayline time compressor providing an output in which each portion of the signal from said second amplitude detector is repeated a plurality of times to reconstruct the original signal.

2. A delay line time expander and a delay line time compressor, as described in claim 1, in which said cycle repetition means comprises a plurality of heads equidistantly spaced, one of which records on tape the signal produced at the output of said second amplitude detector and the others of which are playback heads whose outputs enter a responsive comparator which selects only the playback head signal of greatest strength, thus providing said output.

3. A delay line time expander and a delay line time compressor, as described in claim 1, in which said cycle repetition means comprises a fixed delay line responsive to the output of said second amplitude detector and having a plurality of taps equally spaced along said fixed delay line, the signals from which taps enter a responsive comparator which selects only the signal of greatest strength, thus providing said output.

4. A delay line time expander and a delay line time compressor, as described in claim 1, in which a hold circuit and a compare circuit are responsive to said delay line time expander such that said hold circuit holds said first amplitude detector output at the end of each period of said first sawtooth waveform until said first amplitude detector output again reaches a value nearly equal to the value being held, as determined by said compare circuit, whereupon said hold circuit ceases to function until the end of said first sawtooth waveform period, whereupon it repeats the action just described, thereby providing a smooth output waveform in which broadband transients are minimized.

5. A delay line time compressor and a delay line time expander for compressing an information signal into short time intervals, and subsequently expanding it to occupy a time span as long as the original span, comprising:

a delay line time compressor which requires only a time compression means and which consists of:

a first amplitude modulator for impressing said information signal on a first carrier signal to produce a first amplitude modulated signal;

a first series of identical all-pass delay networks, having a predetermined phase versus frequency characteristic, responsive to said first amplitude modulated signal produced by said first amplitude modulator;

a first key for gating said first carrier signal to said first amplitude modulator;

a first sawtooth-controlled reactance-tube oscillator for producing said first carrier signal and for sweeping with a first sawtooth waveform the frequency of said first carrier signal, said first carrier signal then being sent through said first key at all times, except during said first sawtooth waveform's flyback, to said first amplitude modulator and thence to said first series of all-pass delay networks to impart a first variable time delay to said first amplitude modulated signal as obtained at the output of said first series of all-pass delay networks;

a first amplitude detector responsive to said first series of all-pass delay networks to produce a time compressed information signal; and, a delay line time expander which requires only a time expansion means, said delay line time expander consisting of:

a second amplitude modulator for impressing said time-compressed information signal on a second carrier signal to produce a second amplitude modulated signal;

a second series of identical all-pass delay networks constructed with the same phase versus frequency characteristics as said first series, and responsive to the second amplitude modulated signal produced by said second amplitude modulator;

a second key for gating said second carrier signal to said second amplitude modulator;

a second sawtooth-controlled reactance-tube oscillator for producing said second carrier signal and for sweeping with a second sawtooth waveform, whose repetition rate is the same as that of said first sawtooth waveform, the frequency of said second carrier signal, said second carrier signal then being sent through said key at all times, except during said second sawtooth waveform's flyback, to said second amplitude modulator and thence to said second series of allpass delay networks to impart a second variable time delay to said second amplitude modulated signal as obtained at the output of said second series of all-pass delay networks, said second variable time delay being maximum when said first variable time delay is minimum, and vice versa;

a second amplitude detector responsive to said second series of all-pass delay networks to produce said time-expanded signal.

6. A delay line time compressor and a delay line time expander, as described in claim 5, in which a hold circuit and a compare circuit are responsive to said delay line time expander such that said hold circuit holds said second amplitude detector output at the end of each period of said second sawtooth waveform until said second amplitude detector output again reaches a value nearly equal to the value being held, as determined by said compare circuit, whereupon said hold circuit ceases to function until the end of said second sawtooth waveform period, whereupon it repeats the action just described, thereby providing a smooth output waveform in which broadband transients are minimized.

* * * * *